United States Patent [19]

Hatano

[11] Patent Number: 5,748,260
[45] Date of Patent: May 5, 1998

[54] LUMINANCE AND CHROMINANCE SIGNAL SEPARATING APPARATUS

[75] Inventor: Takahisa Hatano, Sapporo, Japan

[73] Assignee: Matsushita Electric Industrial Co., Ltd., Osaka, Japan

[21] Appl. No.: 393,804

[22] Filed: Feb. 24, 1995

[30]   Foreign Application Priority Data

Feb. 25, 1994  [JP]  Japan .................................. 6-027936

[51] Int. Cl.⁶ .................................................. H04N 9/78
[52] U.S. Cl. ........................... 348/663; 348/665; 348/667
[58] Field of Search ................................ 348/663, 665, 348/666, 667, 670; 358/31; H04N 9/78

[56]        References Cited

U.S. PATENT DOCUMENTS

| | | | |
|---|---|---|---|
| 4,227,204 | 10/1980 | Rossi . | |
| 4,470,069 | 9/1984 | Lewis, Jr. | 348/665 |
| 4,500,912 | 2/1985 | Bolger | 348/665 |
| 4,549,117 | 10/1985 | Takahashi . | |
| 5,305,096 | 4/1994 | Yamagami | 348/242 |

FOREIGN PATENT DOCUMENTS 2154093   8/1985   United Kingdom .

OTHER PUBLICATIONS

UK Search Report.

*Primary Examiner*—Sherrie Hsia
*Attorney, Agent, or Firm*—Ratner & Prestia

[57]        ABSTRACT

A luminance and chrominance signal separating apparatus includes an A/D converter for A/D converting an input composite color television signal by a frequency of eight times of a color subcarrier frequency; a decimation filter for converting the A/D converted digital video signal into a signal with a frequency of four times of the color subcarrier frequency; a chrominance signal separating circuit for extracting a chrominance signal from the signal which was thinned-out by the frequency of four times of the color subcarrier frequency; an interpolating filter for converting the separated chrominance signal into a signal with a frequency of eight times the color subcarrier frequency and outputting a chrominance signal; a delay device for delaying the A/D converted digital video signal by a delay time which occurs when the A/D converted digital video signal passes through the decimation filter, the chrominance signal separator and the interpolating filter; and a subtracting circuit for subtracting the chrominance signal at the output of the interpolating filter from the digital video signal at the output of the delay device and outputting a luminance signal.

5 Claims, 3 Drawing Sheets

LUMINANCE AND CHROMINANCE SIGNAL SEPARATING APPARATUS

BACKGROUND OF THE INVENTION

1. Field of the Invention

The present invention relates to a luminance and chrominance signal separating apparatus for separating a luminance signal and a chrominance signal from a composite color television signal.

2. Description of the Prior Art

Digitalization is currently applied to circuits that separate luminance and chrominance signals. In an adaptive type luminance and chrominance signal separation circuit, a filter is selected for extracting a chrominance signal according to a correlation between a signal at an arbitrary reference point on the picture and a signal at a tertiary or secondary dimensional vicinity of the reference point. In an adaptive type circuit, delays are desirable to extract various kinds of correlations. In a digital adaptive type circuit, memory devices are usually used as a delay device.

FIG. 1 is a block diagram of a luminance and chrominance signal separating apparatus in accordance with the prior art. FIG. 2 is a block diagram of a chrominance signal separating circuit used in a luminance and chrominance signal separating apparatus in accordance with the prior art.

An input composite color television signal is received at chrominance signal separating circuit 202. In the adaptive type chrominance signal separating circuit 202, the input composite color television signal is delayed by one horizontal period at line memories 301 and 302. Correlations between the input composite color television signal and a signal delayed by one horizontal period at the line memory 301 and between the signal delayed by one horizontal period at the line memory 301 and the signal delayed by two horizontal periods at the line memory 302 are obtained at a correlation detector 303. A chrominance signal output from comb filter 304 or 305 or a frequency separating filter 306 is selected according to the correlation output of the correlation detector 303 at a selector 307 and an optimum chrominance signal is outputted from the selector 307. For example, if the correlation between the input composite color television signal and the signal delayed by one horizontal period is strong, the output of the comb filter 305 is selected. If the correlation between the signal delayed by one horizontal period and the signal delayed by two horizontal periods is strong, the output of the comb filter 304 is selected. If both correlations are weak, the output of the frequency separating filter 306 is selected. Thus, an optimum separation of a chrominance signal can be obtained.

A delay device 203 is provided to compensate for the time delay of the chrominance signal. Delay device 203 delays the input composite color television signal by the time delayed at the chrominance signal separating circuit 202. A luminance signal is obtained by subtracting the chrominance signal outputted from the adaptive type chrominance signal separating circuit 202 from the delayed composite color television signal at a subtracter 204.

In the above-explained configuration, however, the clock frequency for digitalizing a composite color television signal has to be high in order to increase horizontal resolution of the luminance signal. In an adaptive type chrominance signal separating circuit, if the clock frequency of the A/D converter 201 is increased from four times subcarrier frequency to eight times subcarrier frequency, i.e., 4 fsc (fsc means subcarrier frequency) to 8 fsc, increased memory capacity of the delay device and increased power consumption may be required.

SUMMARY

A luminance and chrominance signal separating apparatus includes an A/D converter for converting an analog input composite color television signal to a digital video signal with a frequency of eight times of the subcarrier frequency, 8 fsc; a decimation filter for converting the A/D converted digital video signal to a signal with a 4 fsc rate; a chrominance signal separating circuit for extracting a chrominance signal from the signal with the 4 fsc rate; an interpolating filter for converting the separated chrominance signal to a signal with a 8 fsc rate and outputting a chrominance signal; a delay device for delaying the converted digital video signal by the delay time which occurs when the converted digital video signal passes through the decimation filter, chrominance signal separating circuit and the interpolating filter; and a subtracting circuit for subtracting the chrominance signal outputted from the interpolating filter from the digital video signal outputted from the delay device and outputting a luminance signal.

DETAILED DESCRIPTION OF THE INVENTION

Figure 3:
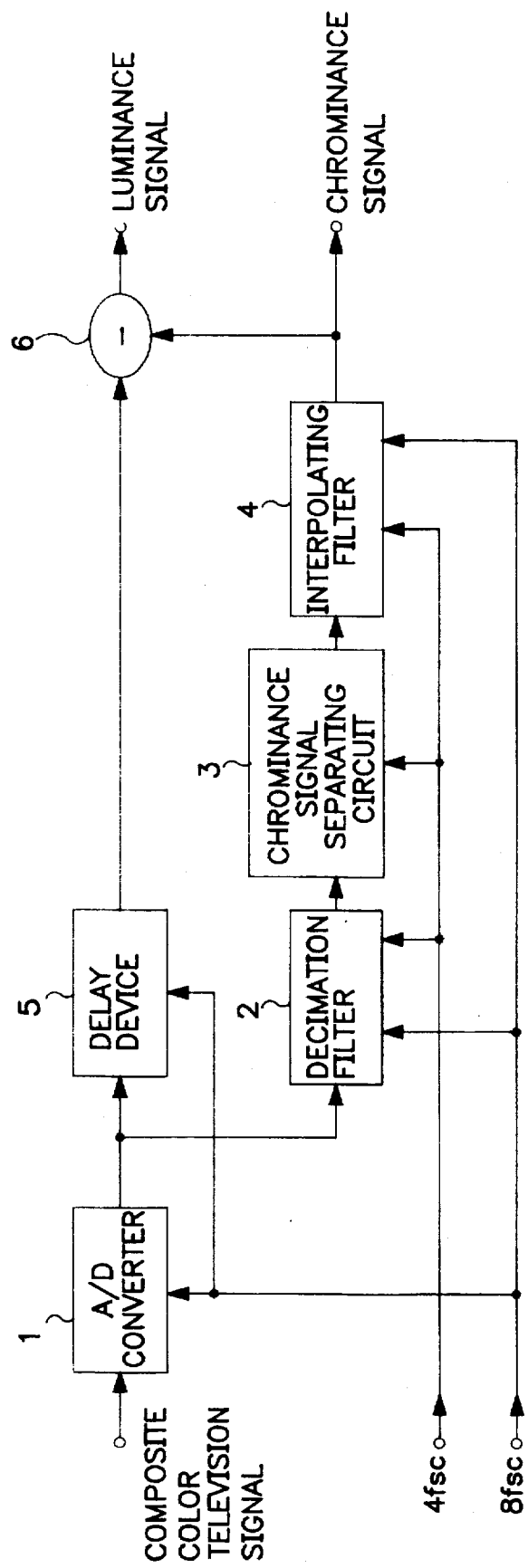
FIG. 3 is a block diagram of a luminance and chrominance signal separating apparatus in accordance with an exemplary embodiment of the present invention.

FIG. 3 is a block diagram of a luminance and chrominance signal separating apparatus in accordance with an exemplary embodiment of the present invention.

A/D converter 1 converts an input composite color television signal to a digital signal at a frequency of 8 fsc. The digital signal is converted to a signal with a frequency of 4 fsc at a decimation filter 2. The decimation filter 2 operates by selecting every other sampling point after limiting the bandwidth of the input signal sampled with a frequency of 8 fsc to a bandwidth lower than the Nyquist frequency for a frequency 4 fsc, (i.e., 2 fsc). This is accomplished through a low pass filter.

Figure 1:
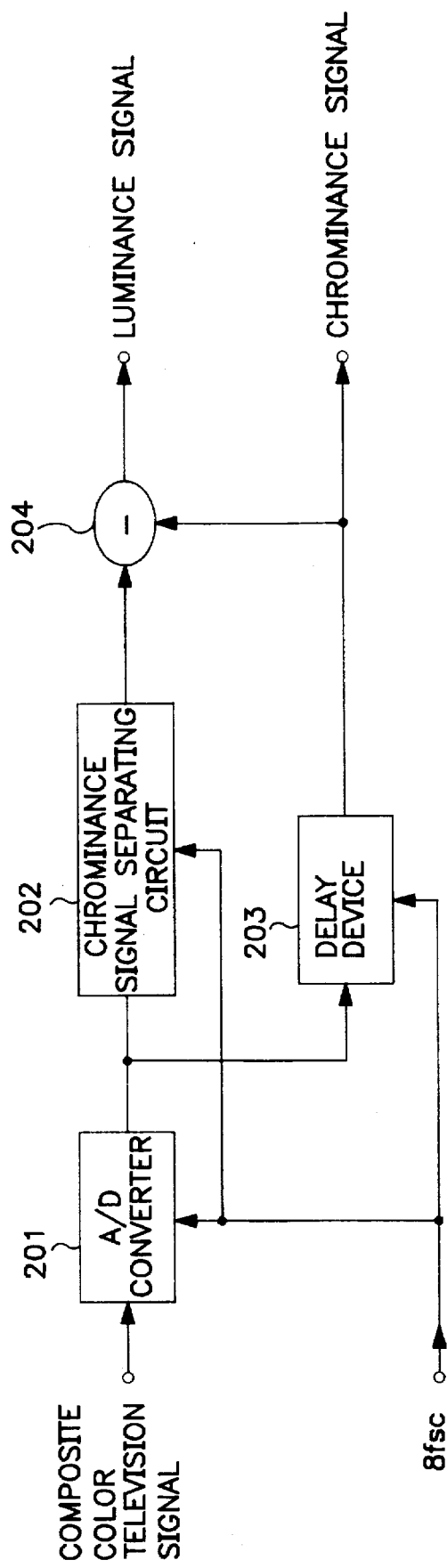
FIG. 1 is a block diagram of a luminance and chrominance signal separating apparatus in accordance with the prior art.
Figure 2:
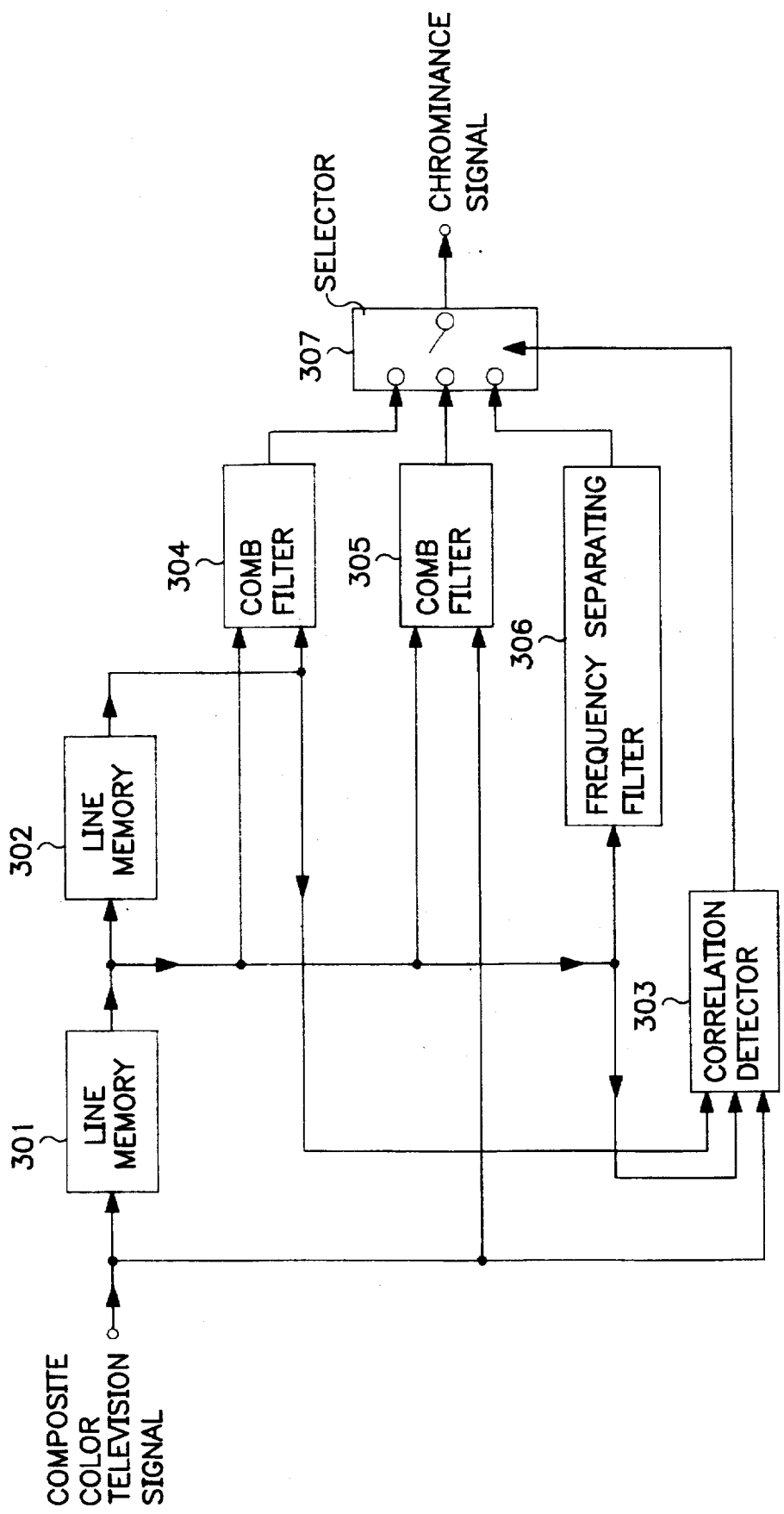
FIG. 2 is a block diagram of a chrominance signal separating circuit used in a luminance and chrominance signal separating apparatus in accordance with the prior art.

A chrominance signal is extracted from the 4 fsc signal at an adaptive type chrominance signal separating circuit 3. The adaptive type chrominance signal separating circuit 3 is similar to that used in the prior art shown in FIG. 2 although the clock frequency is different. An adaptive type chrominance signal separating circuit 3 selects a comb filter or a frequency separating filter included in the chrominance signal separating circuit 3 according to various kinds of correlations.

For example, in a secondary dimensional adaptive type correlation, the chrominance signal separating circuit 3 selects a comb filter or a frequency separating filter according to the correlation between a signal at an arbitrary reference point on the screen and a signal at a vertical vicinity of the reference point. In order to obtain a correlation between a signal at the reference point and a signal at the vertical vicinity of the reference point, a correlation between a signal at a reference point and a signal delayed by one horizontal period from the signal at the reference point is used using a delay device.

Because the chrominance signal separating circuit 3 operates at a frequency of 4 fsc, the circuit scale and the memory capacity of the delay device are smaller compared with the case in which the digital chrominance signal with a frequency of 8 fsc is separated with a clock frequency of 8 fsc. This is possible because the frequency characteristics do not deteriorate even if the signal is processed with a clock frequency of 4 fsc at the bandwidth of a chrominance signal because a chrominance signal is extracted at the chrominance signal separating circuit 3.

The output signal of the chrominance signal separating circuit 3 is converted from a signal with a frequency of 4 fsc to a signal with a frequency of 8 fsc at a following interpolating filter 4. The output signal of the interpolating filter 4 is a chrominance signal. A low pass filter which interpolates linearly is used as an interpolating filter 4. The composite color television signal which is converted to a digital signal at the A/D converter 1 is inputted to a delay device 5.

The delay device 5 delays the digital composite color television signal by the amount of time by which the digital composite color television signal is delayed passing through the decimation filter 2, the chrominance signal separator 3 and the interpolating filter 4. At a subtracting circuit 6, the chrominance signal with a frequency of 8 fsc (which is an output of the interpolating filter 4) is subtracted from the delayed composite color television signal and a luminance signal is outputted.

The route of a luminance signal works with a frequency of 8 fsc and there is no deterioration in the frequency characteristic. The chrominance separating circuit works with a frequency of 4 fsc and has a merit of less power consumption.

Thus, a luminance and chrominance signal separating apparatus in accordance with an exemplary embodiment of the present invention can improve horizontal resolution of the displayed picture and at the same time may prevent an increase in circuit size, an increase in the memory capacity of the delay device and an increase in the power consumption.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A luminance and chrominance signal separating apparatus comprising:

A/D converting means for A/D converting an input composite color television signal to a digital video signal with a frequency of eight times a subcarrier frequency of said input composite color television signal;

decimation filtering means including a low pass filter for converting the digital video signal into a further signal with a frequency of four times the subcarrier frequency of said input composite color television signal;

chrominance signal separating means select one of a plurality of filters for extracting a chrominance signal with the frequency of four times the subcarrier frequency of said input composite color television signal, from the further signal;

interpolating filtering means for low pass filtering the chrominance signal and converting said filtered chrominance signal into an additional signal with the frequency of eight times the subcarrier frequency of said input composite color television signal;

delay means for delaying said digital video signal to generate a delayed signal having a delay time corresponding to total delay times of said decimation filtering means, said chrominance signal separating means and said interpolating filtering means; and subtracting means for subtracting said additional signal from the delayed signal and outputting a luminance signal.

2. The signal separating apparatus of claim 1 wherein said interpolating filtering means uses 1) the frequency of four times the subcarrier frequency of said input composite color television signal and 2) the frequency of eight times the subcarrier frequency of said input composite color television signal for filtering and converting the chrominance signal.

3. The signal separating apparatus of claim 1 wherein said decimation filtering means converts the digital video signal by limiting a bandwidth of the digital video signal with the frequency of eight times the subcarrier frequency of said color television signal.

4. The signal separating apparatus of claim 1 wherein the chrominance signal separating means extracts the chrominance signal from the further signal using the frequency of four times the subcarrier frequency of said input composite color television signal.

5. A luminance and chrominance signal separating apparatus according to claim 1 wherein said further signal generated by said decimation filtering means has a band width lower than a Nyquist frequency for said frequency of four times the subcarrier frequency.

* * * * *